US009198193B1

(12) United States Patent
Williams et al.

(10) Patent No.: US 9,198,193 B1
(45) Date of Patent: Nov. 24, 2015

(54) SYSTEMS AND METHODS FOR CONTROLLING NETWORK CONNECTION OVERHEAD ASSOCIATED WITH MOBILE DEVICE COMMUNICATIONS

(71) Applicant: Google Inc., Mountain View, CA (US)

(72) Inventors: Matthew Jay Williams, Berkeley, CA (US); Subir Jhanb, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/289,857

(22) Filed: May 29, 2014

(51) Int. Cl.
*H04W 74/04* (2009.01)
*H04W 52/00* (2009.01)
*H04W 52/02* (2009.01)
*H04L 29/08* (2006.01)

(52) U.S. Cl.
CPC ............... *H04W 74/04* (2013.01); *H04L 67/10* (2013.01); *H04W 52/0216* (2013.01)

(58) Field of Classification Search
CPC ... H04W 76/007; H04W 4/22; H04W 84/045; H04W 48/18; H04W 76/02; H04W 28/18; H04W 4/14; H04W 76/022; H04W 74/04; H04W 52/0216; H04N 21/814; H04N 21/4882; H04N 20/59
See application file for complete search history.

(56) References Cited

U.S. PATENT DOCUMENTS

| 6,745,021 B1* | 6/2004 | Stevens ...................... 455/404.1 |
| 2009/0253399 A1* | 10/2009 | Snapp ......................... 455/404.1 |
| 2011/0059718 A1* | 3/2011 | Wang et al. ................. 455/404.1 |
| 2011/0171926 A1* | 7/2011 | Faccin et al. ............... 455/404.1 |

* cited by examiner

*Primary Examiner* — Nizar Sivji
(74) *Attorney, Agent, or Firm* — Troutman Sanders LLP; James E. Schutz; Mark Lehi Jones

(57) ABSTRACT

Systems and methods include storing execution parameters for handling application messages for two or more client applications and storing callback paths for notifying the two or more client applications of transmission of the application messages. The method includes receiving an indication of a client application message available for transmission, receiving one or more network control messages that include an indication of an activity state of a network. The method includes determining whether to delay the client application message. Responsive to the determining, based at least in part on the indication from the one or more network control messages that a network connection is active, the method includes allowing transmission of the client application message, and sending an indication of acknowledgement by one or more of the callback paths.

20 Claims, 4 Drawing Sheets

SYSTEMS AND METHODS FOR CONTROLLING NETWORK CONNECTION OVERHEAD ASSOCIATED WITH MOBILE DEVICE COMMUNICATIONS

BACKGROUND

When a mobile device prepares to transmit data across a mobile network, a battery drain cost is incurred due to the initial overhead process of waking up the radio and establishing a communication connection with a cell tower. This initial overhead varies based on physical location, network carrier, type of connection, etc., but it can be large enough to justify maintaining the established connection for an extra duration after the network data has been transmitted so that further overhead costs can be reduced. Mobile devices are typically designed to handle transactions immediately for time-critical or user-facing operations (such as placing phone calls, sending text messages, etc.,) and for such operations, the setup overhead costs are justified. However, other background operations that are not necessarily time-sensitive can cause radio wake up and unnecessarily drain the battery.

SUMMARY

Certain implementations of the disclosed technology may include systems and methods for controlling network connection overhead associated with mobile device communications. In particular, example implementations can include scheduling and/or coordinating events and or data for transmission.

According to an example implementation, a method is provided that includes storing execution parameters for handling application messages for two or more client applications; storing callback paths for notifying the two or more client applications of transmission of the application messages; receiving, by a processor of a computing device, and from at least one of the two or more client applications, an indication of a client application message available for transmission, wherein the indication includes a priority designation associated with the client application message; receiving one or more network control messages associated with a persistent connection, wherein the one or more network control messages include an indication of an activity state of a network; determining, based on the priority designation, the stored execution parameters and the one or more network control messages, whether to delay the client application message; responsive to the determining, based at least in part on the indication of the activity state of the received one or more network control messages that a network connection is active, allowing transmission of the client application message; and responsive to a transmission of the client application message, sending an indication of acknowledgement by one or more of the callback paths.

According to another example implementation, a system is provided. The system includes at least one memory for storing data and computer-executable instructions, and at least one processor configured to access the at least one memory and further configured to execute the computer-executable instructions to cause the system to store execution parameters for handling application messages for two or more client applications; store callback paths for notifying the two or more client applications of transmission of the application messages; receive, by the at least one processor and from at least one of the two or more client applications, an indication of a client application message available for transmission, wherein the indication includes a priority designation associated with the client application message; receive one or more network control messages associated with a persistent connection, wherein the one or more network control messages include an indication of an activity state of a network; determine, based on the priority designation, the stored execution parameters and the one or more network control messages, whether to delay the client application message; responsive to the determining, based at least in part on the indication of the activity state of the received one or more network control messages that a network connection is active, allow transmission of the client application message; and responsive to a transmission of the client application message, send an indication of acknowledgement by one or more of the callback paths.

According to another example implementation, a computer-readable storage medium is provided that stores instructions executable by one or more processors. The instructions are configured to cause the one or more processors to perform a method that includes storing execution parameters for handling application messages for two or more client applications; storing callback paths for notifying the two or more client applications of transmission of the application messages; receiving, by a processor of a computing device, and from at least one of the two or more client applications, an indication of a client application message available for transmission, wherein the indication includes a priority designation associated with the client application message; receiving one or more network control messages associated with a persistent connection, wherein the one or more network control messages include an indication of an activity state of a network; determining, based on the priority designation, the stored execution parameters and the one or more network control messages, whether to delay the client application message; responsive to the determining, based at least in part on the indication of the activity state of the received one or more network control messages that a network connection is active, allowing transmission of the client application message; and responsive to a transmission of the client application message, sending an indication of acknowledgement by one or more of the callback paths.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
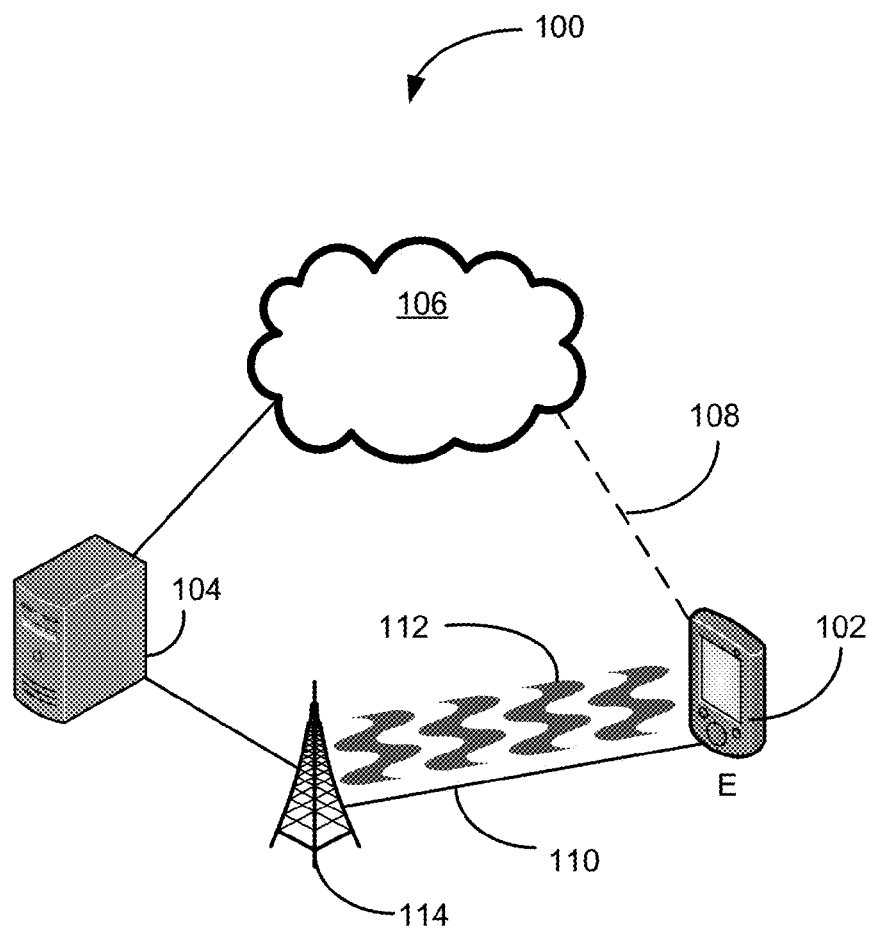
FIG. 1 is a block diagram of an illustrative communications system 100 according to an example implementation of the disclosed technology.

Some implementations of the disclosed technology will be described more fully hereinafter with reference to the accompanying drawings. This disclosed technology may however, be embodied in many different forms and should not be construed as limited to the implementations set forth herein.

Often, applications running on mobile computing devices will implement their own scheduling/retry/persistence mechanisms for their various activities that require communications over the network. Certain example implementations of the disclosed technology can offload, coordinate, and control such mechanisms among multiple client applications by a resident scheduling agent on the mobile computing device. In certain example implementations of the disclosed technology, the "centralized" scheduling agent may help reduce the complexity of the applications while improving battery life of the device. In accordance with an example implementation of the disclosed technology, the more applications that use the scheduler, the more efficient the network usage may be, and the overhead costs associated with network connection setup may be reduced accordingly.

Implementations of the disclosed technology include a network-aware scheduler that can monitor network connectivity and activity. In certain example implementations, the scheduler may receive a bundle of parameters from a plurality of client applications associated with a computing device. The scheduler may use the received parameters in conjunction with detected network activity to control how network usage requests from the client applications are to be executed. Example implementations can further inform the requesting client applications when the requests are satisfied, for example, via a pre-established callback path as provided in the parameter bundle.

In an example implementation, a client application may send an indication to the network-aware scheduler that one or more client messages are available, ready, pending, otherwise waiting for transmission. In an example implementation, the indication may include a priority designation associated with the client application message. For example, a high priority designation may cause the scheduler to work in conjunction with a processor of the mobile computing device to establish network connectivity and deliver an upstream message immediately, while a low priority designation may allow the scheduler to hold the message until network activity is detected. For example, accumulated lower priority messages (that have not timed out) may be coordinated for transmission when network activity related to other usage is detected by the scheduler and/or when a control message is received indicating network activity, as discussed below.

In accordance with an example implementation of the disclosed technology, one or more network control messages associated with a persistent connection may be received for indicating an activity state of a network. Certain example implementations of the disclosed technology can include delaying transmission of the client application message based on the associated priority designation and on the indication of the activity state of the received one or more network control messages. Conversely, the scheduler may cause the mobile computing device to transmit the client application message via an established network connection in response to an indication of the activity state provided by the received one or more network control messages.

Certain implementations of the disclosed technology may address the problem of coordinating, holding, and/or transmitting various client application messages and/or handling various tasks. Implementations may utilize information about the state of a computing device's communication radio to determine when to send the messages. According to certain example implementations, the client application may work in conjunction with the scheduler to initiate transmission of client messages when it is determined that the timing is right, for example, based on activity state, priority, etc.

Some implementations may utilize a low-power communication connection to assist in coordinating the holding and/or the transmitting. In one example implementation, the low-power communication connection may be a persistent connection that is akin to a periodic ping or heartbeat signal that allows the mobile device to return to a lower power listening state between pings. According to implementations, a mobile connection service and/or cloud connection service may provide the low power or persistent communication connection for communicating the device's radio state to a server. In certain example implementations of the disclosed technology, the connection service may be utilized to request radio resources from the computing device. For example, if no packets are being sent or received, the mobile device (or the server) may send a heartbeat ping packet to tell the other end that the connection is still alive. For example, pings may be exchanged every minute or at some other predetermined periodic interval. For example, in one implementation, the pings may be exchanged every 28 minutes. According to some implementations, the server can use knowledge obtained from this method to send information to the computing device, and vice-versa.

Some implementations of the disclosed technology enable conservation of computing and battery resources, at least in part, because the mobile computing device does not necessarily need to wake up the radio and establish a network connection to send every new message as it arrives from resident client applications. According to an implementation, low priority upstream messages may be held on the mobile computing device, for example, until a predetermined time has elapsed. In an example implementation, when a scheduler on the mobile computing device detects network activity, messages that were held may be sent. Implementations of the disclosed technology may also help extend a device's battery charge by holding messages until the device's radio has been turned on for other reasons.

In accordance with certain implementations, the computing device may default to a low-power listening mode when it is not active, for example, to enable detection of incoming SMS messages or phone calls. According to an implementation, after messaging, phone calls, or other communications requiring use of the radio has completed, and if there is no further traffic, the radio on the mobile device can switch from high power mode to low power mode, or to a listen mode. If at any point in time a server needs to send a message to the computing device while it is in listen mode, the network can send a signal to instruct the computing device to power-up (or wake-up) the radio. In accordance with an implementation, the computing device may obtain a socket of the persistent connection and listen for data that is being sent to the device via the socket.

According to some implementations, the computing device's radio may be in different states of operation, depending on the situation. For example, when sending information or uploading data to the server or cellular network, the computing device's radio may be in a high-powered or active communication mode. During certain periods, the computing device may be in a low-power or listen mode only. The radio may be off when the computing device is completely powered off.

In certain instances, the computing device referred to herein may be a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may refer to a processor, controller, or a central processing unit (CPU). In yet other instances, a computing device may be a set of hardware components.

Various systems, arrangements, and architectures may be utilized for delivering upstream messages from a computing device, according to implementations of the disclosed technology, and will now be described with reference to the accompanying figures.

FIG. 1 is a block diagram of an illustrative communications system 100 according to an example implementation of the disclosed technology. The system 100 may include a computing device 102, a server 104, and various channels 108 110 112 for communication. In accordance with various example implementations of the disclosed technology, the computing device 102 may represent a mobile computing device (generally known as a portable computing device) that can run on batteries.

In an implementation, and with continued reference to FIG. 1, the computing device 102 may communicate with the server 104 through a Wi-Fi™ channel or some other Internet connection 108, for example, and may utilize cloud services or the Internet 106 for communications. According to an implementation, the computing device 102 may communicate to the server 104 through a service provider 114. For example, the service provider 114 may provide cellular service through cellular radio channels 112 for communicating with the computing device 102. According to an implementation, the service provider 114 may also communicate with the computing device 102 through the mobile or cloud connection service 110. According to implementations of the disclosed technology, the computing device 102 may communicate or send messages to the server 104 through the service provider 114.

According to implementations, there may be situations where the computing device 102 is not in range of a Wi-Fi™ channel or other Internet connection 108, and any information communications with the server may then be accomplished via the service provider 114. However, in situations where the computing device 102 has an Internet connection 108, the computing device 102 may communicate with the server 104 (for at least a certain class of signals and messages) via the cloud or internet 106 without needing to utilize the service provider 114.

Figure 2:
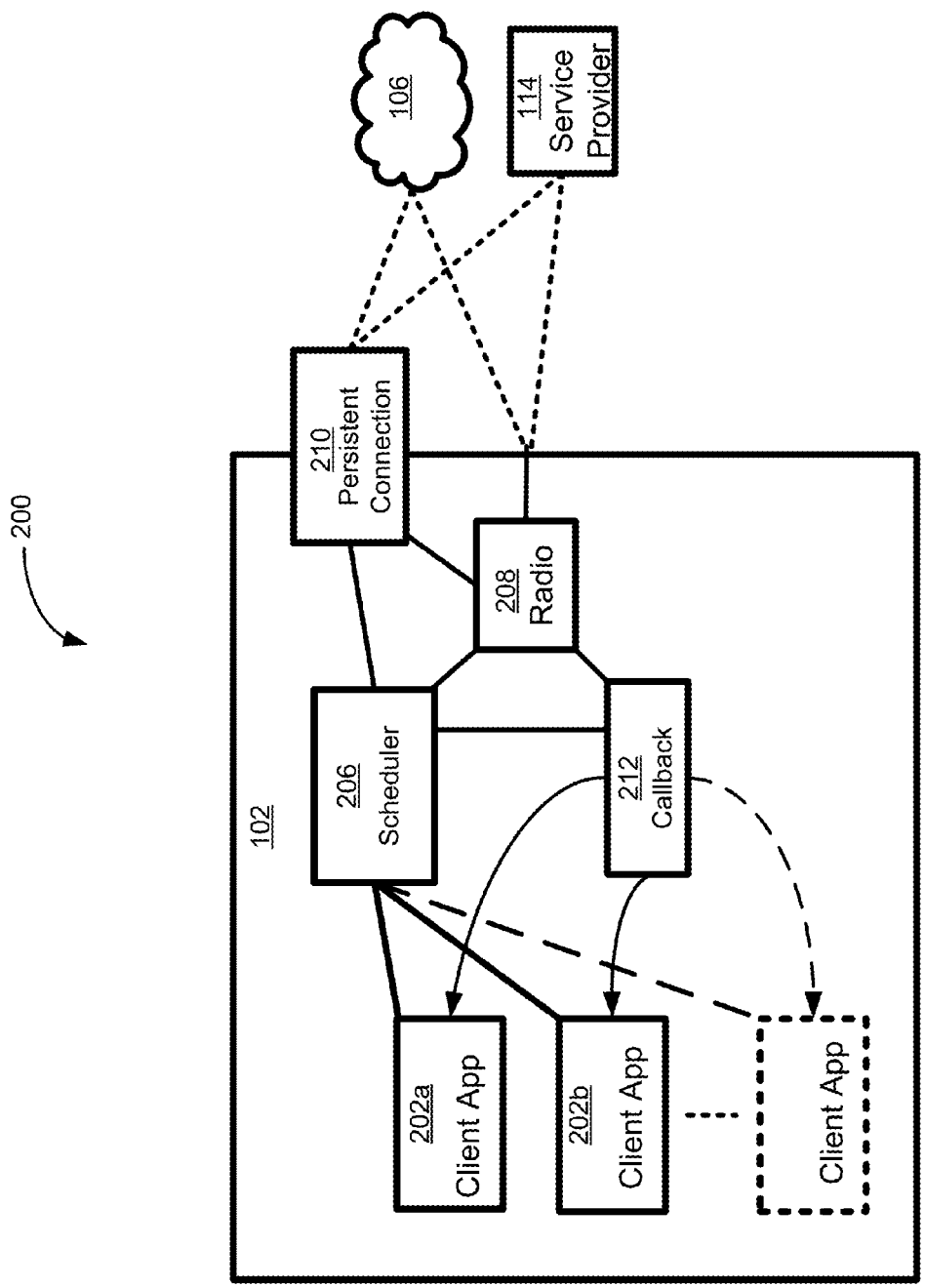
FIG. 2 is a block diagram of an upstream client message handling system 200, according to an example implementation of the disclosed technology.

FIG. 2 depicts an example block diagram of an illustrative message handling system 200. In certain example implementations of the disclosed technology, the message handling system 200 may be utilized for coordinating and delivering upstream messages from client applications 202a 202b residing on a computing device 102. In an example implementation, the computing device 102 (and/or one or more processors associated with the computing device 102, as will be detailed below with respect to FIG. 3) may be configured to execute the client applications 202a 202b. According to an example implementation of the disclosed technology a scheduler 206 may be utilized to receive a bundle of parameters from the various client applications 202a 202b, for example, in order to determine how the applications 202a 202b prefer upstream messages to be handled and delivered. For example, the parameters received by the scheduler 206 may indicate how messages are to be handled based on priority designations, time-outs, expiration dates, etc. In this way, the scheduler 206 may receive the parameters directly from the applications 202a 202b without needing to access a server, for example.

According to an example implementation of the disclosed technology, the process of coordinating the upstream messages may be offloaded from the applications 202a 202b, thereby simplifying the coding process for the application developer. For example, the applications 202a 202b may interface with the scheduler 206 (via API calls for example) to deal with message upload rather than having to coordinate such processes.

According to an example implementation of the disclosed technology, the various client applications 202a 202b may broadcast intents to the scheduler 206 to set up network operations, for example, for fulfilling upstream communications. In an example implementation, when the operation is ready, the scheduler 206 may broadcasts another intent back to the calling application 202a 202b. In certain example implementations of the disclosed technology, an operation may be defined by a window of earliest execution time and latest execution time, along with client-specified data that may be stored by the scheduler and handed back at execution time.

In accordance with an example implementation of the disclosed technology, a start of an operation window may specify the earliest time at which the client application 202a 202b decides the task can be scheduled, while the end of the window may provide the latest time at which the task must be executed. In an example implementation, an operation can be specified to recur periodically until it is canceled. In one example implementation, the operation may be canceled by a user. In another example implementation, the operation may be canceled by the scheduler 206.

In certain example implementations of the disclosed technology, the scheduler 206 may choose an execution order in an attempt to maximize the number of tasks running at once, subject to network constraints. The scheduler 206 may accomplish this by delaying execution of a given task for as long as possible until the radio 208 is turned on and the network comes into use (and/or network activity is detected), at which time the scheduler 206 may execute as many of the operations as it can. Such a process could be visualized as a sluice gate which is intermittently opened to let water through (i.e., the network becomes active, or a task expires) and every time the sluice gate is opened, accumulated water is allowed to pass through the gate.

In certain example implementations of the disclosed technology, the scheduler 206 may use control messages as an indication that there is activity on the network, or that the network is in use. Examples of control messages can include messages sent to or from the computing device 102 via a persistent connection 210. For example, control messages may include configuration information, either for the computing device 102, or for the various client applications 202a 202b. In certain example implementations, the control messages may include push notifications from the cloud to (registered) client applications 202a 202b. In an example implementation, the control messages may include "heartbeats" from the computing device 102 to maintain connection with a backend system or remote server (such as the server 104 as shown in FIG. 1). In certain example implementations of the disclosed technology, control messages may include device to cloud (upstream) messages sent by client applications 202a 202b.

In accordance with an example implementation of the disclosed technology, the message handling system 200 may be configured to collect signals of network activity and/or phone activity from several sources and agglomerate them into one smart scheduling algorithm. Certain example implementations of the disclosed technology may operate in a multi-user environment for accepting and batching tasks from all users.

According to various example implementations of the disclosed technology, rules may be established and utilized by the scheduler 206 to designate, for example, that certain data should not be transmitted, or should not be immediately transmitted, such as duplicate requests, requests for unimportant or non-critical information, or requests that can be satisfied at a later time, such as a time when a network connection has already been established. According to an example implementation of the disclosed technology, computing device 102 may transmits data that the rules have indicated should be transmitted, and performs some other action, e.g., delaying, deleting, aggregating, ignoring, on data that the rules have indicated should not be transmitted.

Figure 3:
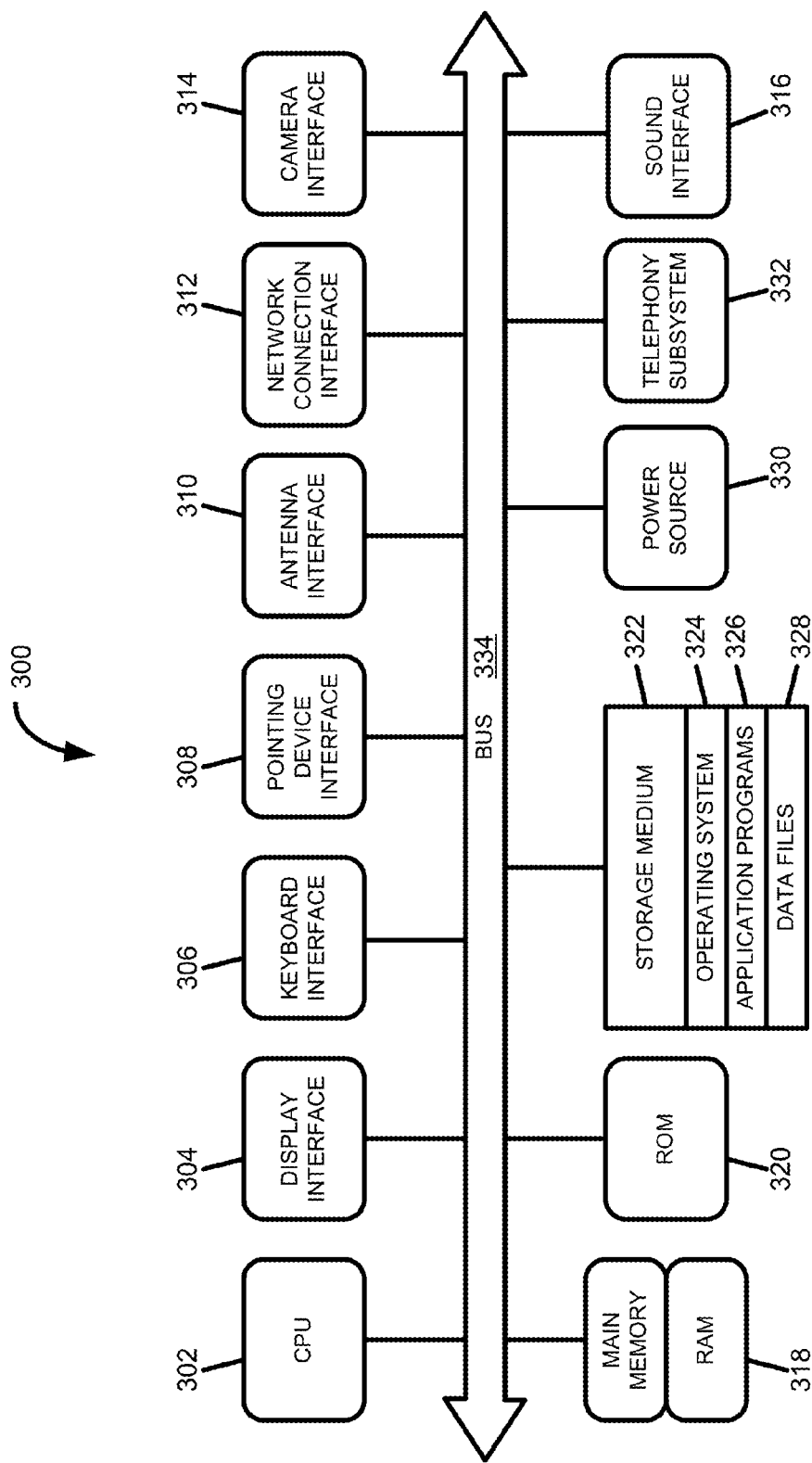
FIG. 3 is a block diagram of an illustrative computing device 300, according to an example implementation of the disclosed technology.

FIG. 3 depicts a block diagram of an illustrative computing device 300 according to an example implementation. Certain aspects of FIG. 3 may be embodied in a mobile computing device (for example, the computing device 102 as shown in FIGS. 1 and 2). According to one example implementation, the term "computing device," as used herein, may be a CPU, or conceptualized as a CPU (for example, the CPU 302 of FIG. 3). In this example implementation, the computing device (CPU) may be coupled, connected, and/or in communication with one or more peripheral devices, such as display. In another example implementation, the term computing device, as used herein, may refer to a mobile computing device, such as a smartphone or tablet computer, for example. In this example implementation, the computing device may output content to its local display and/or speaker(s) and may transmit and receive messages via the antenna interface 310, the network connection interface 312, telephony subsystem 332, etc. In example implementation, the computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

In an example implementation, the network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 300 may include a keyboard interface 306 that provides a communication interface to a keyboard. In one example implementation, the computing device 300 may include a pointing device interface 308 for connecting to a presence-sensitive input interface. According to certain example implementations of the disclosed technology, the pointing device interface 308 may provide a communication interface to various devices such as a touch screen, a depth camera, etc.

The computing device 300 may be configured to use an input device via one or more of input/output interfaces (for example, the keyboard interface 306, the display interface 304, the pointing device interface 308, the network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Example implementations of the computing device 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display that is not directly connected or attached to the system. In certain implementations, a camera interface 314 may act as a communication interface to provide functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example implementation, the computing device 300 includes a power source 330 that provides an appropriate alternating current (AC) or direct current (DC) to power components. According to an example implementation, the computing device 300 includes and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
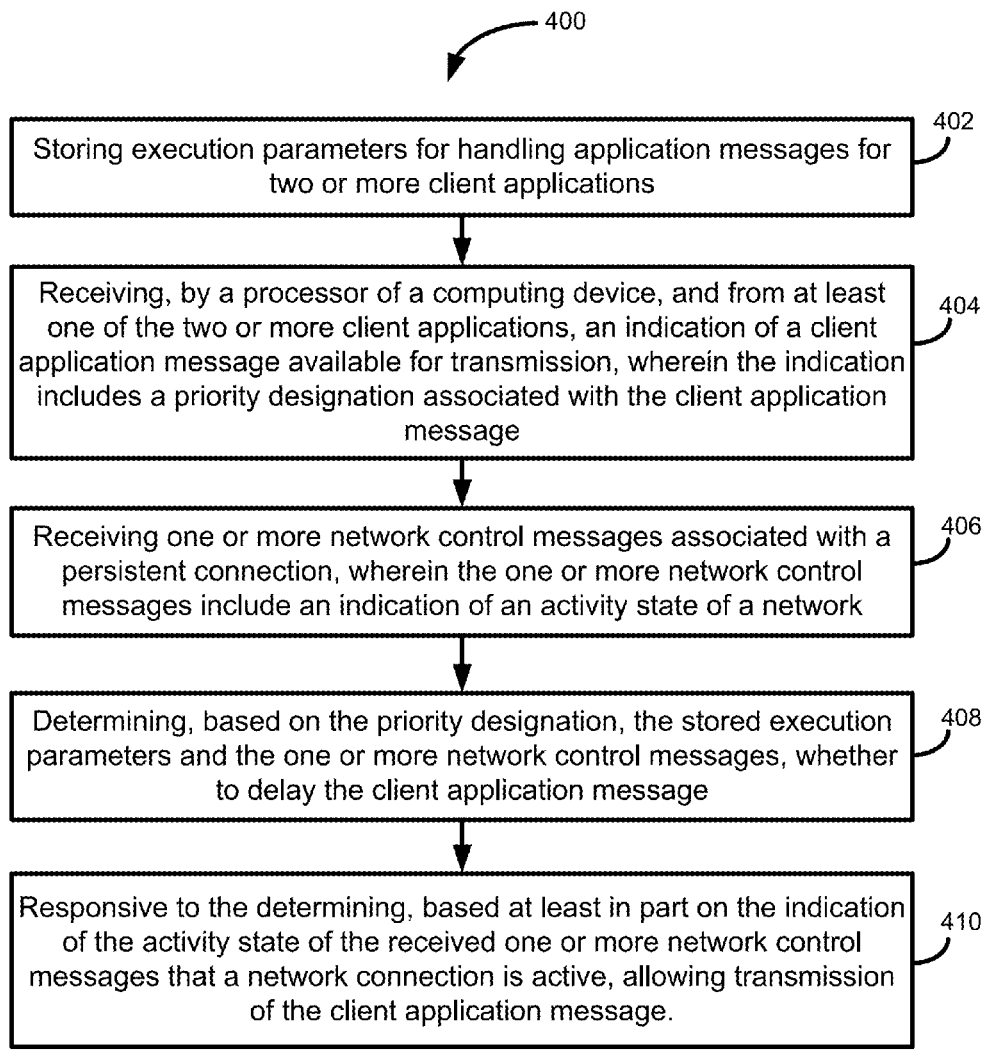
FIG. 4 is a flow diagram of a method according to an example implementation of the disclosed technology.

An example method 400 will now be described with reference to the flowchart of FIG. 4. The method 400 starts in block 402, and according to an example implementation storing execution parameters for handling application messages for two or more client applications. Certain implementations may also include storing callback paths for notifying the two or more client applications of transmission of the application messages. In block 404, the method 400 includes receiving, by a processor of a computing device, and from at least one of the two or more client applications, an indication of a client application message available for transmission, wherein the indication includes a priority designation associated with the client application message. In block 406, the method 400 includes receiving one or more network control messages associated with a persistent connection, wherein the one or more network control messages include an indication of an activity state of a network. In block 408, the method 400 includes determining, based on the priority designation, the stored execution parameters and the one or more network control messages, whether to delay the client application message. In block 410, the method 400 includes, responsive to the determining, based at least in part on the indication of the activity state of the received one or more network control messages that a network connection is active, allowing transmission of the client application message. Certain example implementations also include, responsive to a transmission of the client application message, sending an indication of acknowledgement by one or more of the callback paths.

According to an example implementation of the disclosed technology, receiving the one or more network control messages includes receiving a radio status indicator associated with the computing device. In an example implementation, the persistent connection includes a communication channel between the computing device and a cell tower. In certain example implementations of the disclosed technology, receiving the one or more network control messages by the persistent connection includes receiving the messages by a cloud messaging connection. In certain example implementations of the disclosed technology, receiving the client application message further comprises receiving an indication of message priority, wherein a radio wake message is transmitted to activate the mobile device radio when a high priority message is received at the processor. Certain example implementations of the disclosed technology may further include allowing transmission of all delayed and pending client application messages when allowing transmitting the client application message. In certain implementations, allowing the transmission of the client application message causes at least one of the two or more client applications to initiate transmission of the client application message via the computing device.

Various implementations of the communication systems and methods herein may be embodied in non-transitory computer readable media for execution by a processor.

According to example implementations, certain technical effects can be provided, such as creating certain systems and methods that provide for a reduction in battery drain for mobile computing devices. Example implementations of the disclosed technology can provide the further technical effects of providing systems and methods for reducing overhead costs and network traffic associated with establishing a network connection between a computing device and a cell tower.

In the foregoing description, numerous specific details have been set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

The various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In example implementations of the disclosed technology, the computing device 300 may include any number of hardware and/or software applications that are executed to facilitate any of the operations. In example implementations, one or more I/O interfaces may facilitate communication between the computing device 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the computing device 300 with more or less of the components illustrated in FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
    storing execution parameters for handling application messages for two or more client applications;

storing callback paths for notifying the two or more client applications of transmission of the application messages;

receiving, by a processor of a computing device, and from at least one of the two or more client applications, an indication of a client application message available for transmission, wherein the indication includes a priority designation associated with the client application message;

receiving one or more network control messages associated with a persistent connection, wherein the one or more network control messages include an indication of an activity state of a network;

determining, based on the priority designation, the stored execution parameters and the one or more network control messages, whether to delay the client application message;

responsive to the determining, based at least in part on the indication of the activity state of the received one or more network control messages that a network connection is active, allowing transmission of the client application message; and responsive to a transmission of the client application message, sending an indication of acknowledgement by one or more of the callback paths.

2. The computer-implemented method of claim 1, wherein receiving the one or more network control messages includes receiving a radio status indicator associated with the computing device.

3. The computer-implemented method of claim 1, wherein the persistent connection includes a communication channel between the computing device and a cell tower.

4. The computer-implemented method of claim 1, wherein receiving the one or more network control messages by the persistent connection comprises receiving the messages by a cloud messaging connection.

5. The computer-implemented method of claim 1, wherein receiving the indication of the client application message available for transmission further comprises receiving an indication of message priority, wherein a radio wake message is transmitted to activate the mobile device radio when a high priority message is received by the processor.

6. The computer-implemented method of claim 1, further comprising allowing transmission of all delayed and pending client application messages when allowing transmitting the client application message.

7. The computer-implemented method of claim 1, wherein allowing the transmission of the client application message causes at least one of the two or more client applications to initiate transmission of the client application message via the computing device.

8. A system comprising:
at least one memory for storing data and computer-executable instructions; and
at least one processor configured to access the at least one memory and further configured to execute the computer-executable instructions to cause the system to:
store execution parameters for handling application messages for two or more client applications;
store callback paths for notifying the two or more client applications of transmission of the application messages;
receive, by the at least one processor and from at least one of the two or more client applications, an indication of a client application message available for transmission, wherein the indication includes a priority designation associated with the client application message;
receive one or more network control messages associated with a persistent connection, wherein the one or more network control messages include an indication of an activity state of a network;
determine, based on the priority designation, the stored execution parameters and the one or more network control messages, whether to delay the client application message;
responsive to the determining, based at least in part on the indication of the activity state of the received one or more network control messages that a network connection is active, allow transmission of the client application message; and
responsive to a transmission of the client application message, send an indication of acknowledgement by one or more of the callback paths.

9. The system of claim 8, wherein the one or more network control messages includes receiving a radio status indicator associated with a computing device.

10. The system of claim 8, wherein the persistent connection includes a communication channel between a mobile computing device and a cell tower.

11. The system of claim 8, wherein the persistent connection comprises a cloud messaging connection.

12. The system of claim 8, wherein the client application message further comprises an indication of message priority, wherein a radio wake message is transmitted to activate a radio when a high priority message is received at the processor.

13. The system of claim 8, wherein the at least one processor is further configured to allow transmission of all delayed and pending client application messages when allowing transmitting the client application message.

14. The system of claim 8, wherein the at least one processor is further configured to communicate to at least one of the two or more client applications to initiate transmission of the client application message via the computing device when transmission is allowed.

15. A non-transitory computer-readable medium storing software comprising instructions executable by one or more processors which, upon such execution, cause the one or more processors to perform operations comprising:
storing execution parameters for handling application messages for two or more client applications;
storing callback paths for notifying the two or more client applications of transmission of the application messages;
receiving, by a processor of a computing device, and from at least one of the two or more client applications, an indication of a client application message available for transmission, wherein the indication includes a priority designation associated with the client application message;
receiving one or more network control messages associated with a persistent connection, wherein the one or more network control messages include an indication of an activity state of a network;
determining, based on the priority designation, the stored execution parameters and the one or more network control messages, whether to delay the client application message;
responsive to the determining, based at least in part on the indication of the activity state of the received one or more network control messages that a network connection is active, allowing transmission of the client application message; and responsive to a transmission of the client application message, sending an indication of acknowledgement by one or more of the callback paths.

16. The non-transitory computer-readable medium of claim 15, wherein receiving the one or more network control messages includes receiving a radio status indicator associated with the computing device.

17. The non-transitory computer-readable medium of claim 15, wherein the persistent connection includes a communication channel between the computing device and a cell tower.

18. The non-transitory computer-readable medium of claim 15, wherein receiving the one or more network control messages by the persistent connection comprises receiving the messages by a cloud messaging connection.

19. The non-transitory computer-readable medium of claim 15, wherein receiving the client application message further comprises receiving an indication of message priority, wherein a radio wake message is transmitted to activate the mobile device radio when a high priority message is received at the processor.

20. The non-transitory computer-readable medium of claim 15, wherein allowing the transmission of the client application message causes at least one of the two or more client applications to initiate transmission of the client application message via the computing device.

* * * * *